D. W. SOLOMON.
ANIMAL TRAP.
APPLICATION FILED JUNE 12, 1908.
934,699.
Patented Sept. 21, 1909.
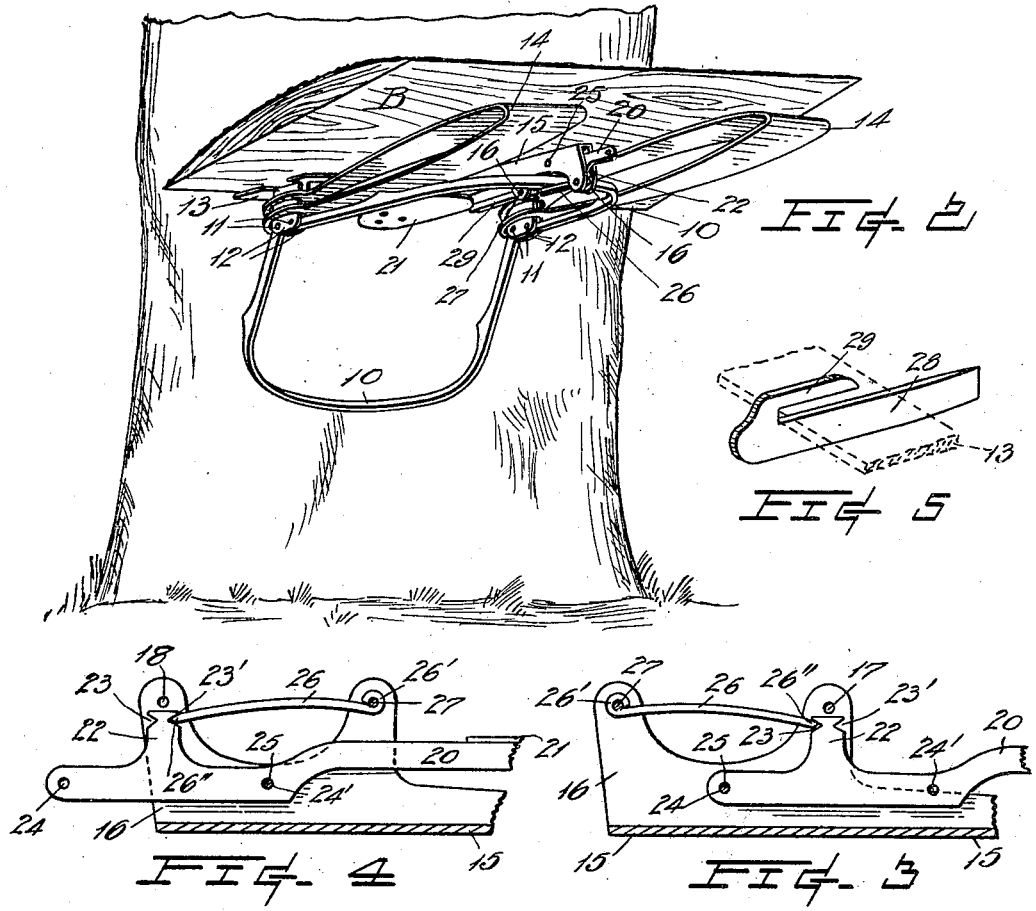
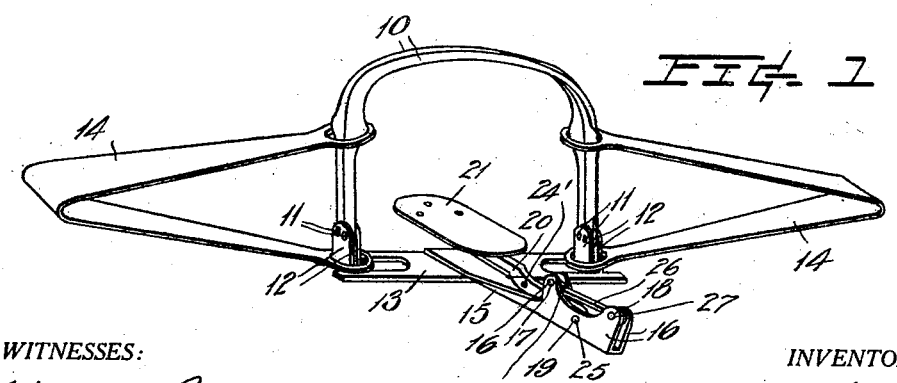
WITNESSES:
Horace Barnes,
G. D. Smith.
INVENTOR.
David W. Solomon
BY
Pierre Barnes
ATTORNEY.

UNITED STATES PATENT OFFICE.

DAVID W. SOLOMON, OF McMURRAY, WASHINGTON.

ANIMAL-TRAP.

934,699.

Specification of Letters Patent. Patented Sept. 21, 1909.

Application filed June 12, 1908. Serial No. 438,119.

*To all whom it may concern:*

Be it known that I, DAVID W. SOLOMON, a citizen of the United States, residing at McMurray, in the county of Skagit and State of Washington, have invented certain new and useful Improvements in Animal-Traps, of which the following is a specification.

This invention relates to improvements in steel-traps; and its object is the provision of means whereby this class of traps may be employed interchangeably for service upon the ground, as ordinary, or in an inverted condition for use in an elevated position.

The invention consists in the novel construction and adaptation of parts as will be hereinafter described and claimed.

In the accompanying drawings, Figure 1 is a perspective view of a trap embodying my invention, shown in upright position. Fig. 2 is a pictorial representation of the trap in a set condition, and secured to a tree in an inverted position. Figs. 3 and 4, are fragmentary vertical sections of the trap to illustrate the arrangement of the treadle-bar and latch with relation to the base-plate when used as in Figs. 1 and 2, respectively. Fig. 5 is a perspective view of a fastening suitable for securing the trap to a tree as represented in Fig. 2.

The reference numeral 10 designates the jaws of a trap which are pivotally connected by pins 11 to upwardly directed ears 12 of a base-plate 13, and 14 represents springs which afford power to actuate the jaws when released. These parts are, or may be, similar in construction and in operation to ordinary steel traps. The base plate is also provided with a forwardly projecting extension 15 with upturned flanges 16 along its lateral edges, but which in the present invention is pierced by three pairs of holes 17, 18 and 19. Of these, the holes 17 and 18 are arranged in the same horizontal plane, or nearly so, and the others, 19, upon a lower plane and about midway between the other holes.

20 represents a treadle-bar which carries a bait-pan 21 at one end and near the other end is formed with an upwardly extending post 22 which is notched as at 23 and 23' upon its opposite faces and in proximity of its top. To each side of the post and in the shank of the treadle-bar are apertures 24 and 24' which are severally arranged to receive a pin 25 which is employed in the holes 19 to fulcrum the bar in the positions in which it is respectively shown in Figs. 3 and 4.

26 is a latch formed with an eye 26' at one end to receive a pin 27 which may be interchangeably used in either of the pairs of holes 17 and 18, and the other end 26'' of the latch is formed to engage in either of the notches 23 or 23' of the bar-post.

The operation of the invention may be described as follows: To use the trap upon the ground, as ordinary, the treadle-bar 15 is connected by the pin 25, as shown in Figs. 1 and 3, engaging in the hole 24 of the bar and the holes 19 of the flanges 16; and the latch 26 connected to the flanges by the pin 27 extending through the holes 18 of the latter and the eye 26' of the latch. Being thus arranged the bar-post 22 is located between the fulcrum of the bar and the bait-pan so that a downward pressure by an animal upon the pan will disengage the post from the engagement with the end of the latch to release the spring pressed jaw of a previously set trap to effect the catching of the animal. For use in an elevated and inverted position upon a tree, or post, the pin 27 is withdrawn from the latch-eye and the holes of the trap-base 18 and reversing the latch, to occupy the position in which it is illustrated in Figs. 2 and 4, the pin is inserted through the holes 17 of the flanges and the eye 26' of the latch. The pin 25 is also withdrawn from its former position and the treadle-bar shifted into the position in which it is illustrated in these views, whereupon the pin 25 is inserted in the holes 24' and 19 of the bar and flanges, respectively. Under such conditions, the post 22 is more remote from the bait-pan than is the fulcrum-pin 25 and, in consequence, when the point 26'' of the latch is engaged in the opposing notch 23' thereof it will necessitate a reverse movement of pan to release the latch, that is, by an operation directly opposite to that required to accomplish such action in the first explained arrangement or affording means whereby the trap may be operated in an inverted position and necessitating a downward pull upon the bait-pan to spring the trap. Under such conditions the bait would be fastened to the pan by strings or wires and the trap itself secured to a tree or post by staples or an equivalent fastening means, such, for example, as the hooked dog shown in Fig. 5, having a part 28 to be driven in the wood, the other or bill post 29 of the hook to embrace the base-plate 13 of the trap.

Ordinarily the trap would only be used in the inverted position in which it is shown in Fig. 2, when the trap when set upon the ground is liable to be tampered with by small animals, such as ground squirrels, or in situations or seasons of the year when the ground is covered with snow. To protect the trap from the effects of falling snow, a block of wood, B, or an equivalent, may advantageously be placed upon the trap to furnish a cover for the same.

With a trap constructed according to the invention, it is possible for a trapper to prosecute his employment under varying conditions and that, too, without encumbering his outfit with a double supply of traps which are severally adapted to but a single service. But little time is required in transforming these traps from one of its binary uses to the other.

What I claim, is—

A trap having a treadle-bar provided with two holes for the reception interchangeably of a fulcrum pin, said bar being provided with a post disposed intermediate said holes and provided with notches in its opposite faces, of a latch arranged to be adjustably connected with the trap for engagement in either of said notches.

Signed at Seattle, Washington, this 27th day of May, 1908, in the presence of two witnesses.

DAVID W. SOLOMON.

Witnesses:
PIERRE BARNES,
HORACE BARNES.